United States Patent [19]

Chung, deceased

[11] Patent Number: 4,489,191

[45] Date of Patent: Dec. 18, 1984

[54] SILANE SCAVENGERS FOR HYDROXY RADICALS CONTAINING SILICON-HYDROGEN BONDS

[75] Inventor: Rack H. Chung, deceased, late of Clifton Park, N.Y., by Betsy A. Chung, executrix

[73] Assignee: General Electric Company, Waterford, N.Y.

[21] Appl. No.: 528,274

[22] Filed: Aug. 31, 1983

[51] Int. Cl.$^3$ ............................................. C08K 3/08
[52] U.S. Cl. ................................. 524/779; 524/786; 524/860; 524/861; 524/863; 528/31; 528/21; 528/33; 528/34; 528/901
[58] Field of Search ............... 528/31, 21, 33, 34, 528/901; 524/779, 786, 860, 861, 863

[56] References Cited

U.S. PATENT DOCUMENTS

| | | | |
|---|---|---|---|
| 3,428,580 | 2/1969 | Nitzsche et al. | 528/31 |
| 3,941,856 | 3/1976 | Creasey et al. | 528/31 |
| 4,151,344 | 4/1979 | Doss et al. | 528/31 |
| 4,251,596 | 2/1981 | de Montigny et al. | 528/31 |
| 4,332,844 | 6/1982 | Hamada et al. | 427/387 |
| 4,395,526 | 7/1983 | White et al. | 528/21 |
| 4,417,042 | 11/1983 | Dziark | 528/18 |

Primary Examiner—Melvyn I. Marquis
Attorney, Agent, or Firm—Gary L. Loser

[57] ABSTRACT

There is provided a one package silicone RTV composition which is convertible to a tack-free elastomer, comprising:
(A) a polydiorganosiloxane base polymer,
(B) an effective amount of condensation catalyst,
(C) a stabilizing amount of scavenger for hydroxy functional groups wherein said scavenger contains at least one silicon-bonded hydrogen;
(D) optionally, a crosslinking silane;
(E) optionally, a cure accelerator; and
(F) optionally, a scavenger for hydrogen gas.

14 Claims, No Drawings

SILANE SCAVENGERS FOR HYDROXY RADICALS CONTAINING SILICON-HYDROGEN BONDS

BACKGROUND OF THE INVENTION

The present invention relates to one component, alkoxy-functional room temperature vulcanizable (RTV) compositions. More particularly, the present invention relates to silicone compounds containing silicon-hydrogen bonds which are useful as scavengers for chemically combined hydroxy groups in one component, alkoxy-functional silicone RTV compositions.

Recently a shelf-stable, fast-curing, one component, alkoxy functional RTV composition was disclosed in the patent of White et al., U.S. Pat. No. 4,395,526, issued July 26, 1983, and assigned to the same assignee as the present invention. Basically White et al. disclose that moisture curable, polyalkoxy terminated organopolysiloxane RTV compositions can be made by combining:

(1) a silanol terminated polydiorganosiloxane base polymer,
(2) a crosslinking silane,
(3) an effective amount of certain silane scavengers for chemically combined hydroxy radicals such as methanol, and
(4) an effective amount of a condensation catalyst.

The scavenger, which can be either a separate compound or part of the crosslinking silane, has a functionality selected from the group consisting of amido, amino, carbamato, enoxy, imidato, isocyanato, oximato, thioisocyanato and ureido. The disclosure of White et al. is incorporated by reference into the present application.

Shortly after the pioneering invention of White et al. it was discovered that compounds other than those disclosed by White et al. could be utilized as scavengers for chemically combined hydroxy groups or as integrated scavenger-cross-linkers. For example, Dziark, U.S. Pat. No. 4,417,042, discloses silazanes and silylnitrogen polymers as scavenger compounds; Lucas, Ser. No. 464,443, filed Feb. 7, 1983, discloses novel acetamide functional silane and siloxanes as scavengers; Chung et al., Ser. No. 428,038 filed Sept. 29, 1982, discloses additional silazane scavengers; Chung, U.S. Pat. No. 4,424,157, discloses silanes having cyclic amide functionality as scavenger compounds; Mitchell, Ser. No. 462,949, filed Feb. 1, 1983, discloses additional amine functional silanes and siloxanes which are effective scavengers and Swiger et al., Ser. No. 476,000, filed Mar. 17, 1983, discloses additional silane and siloxane scavengers. All of the foregoing patents and patent applications are assigned to the same assignee as the present invention and are incorporated by reference into the instant disclosure.

In none of the above cited patent applications was it recognized that a silane or siloxane having silicon-hydrogen bonding could be employed as a scavenger for chemically combined hydroxy groups. Thus it was quite unexpected that such compounds, either alone or in combination with previously known hydroxy scavenging groups, could be utilized as hydroxy scavenging agents to provide silicon RTV compositions which exhibit excellent shelf stability.

It is therefore an object of the present invention to provide novel hydroxy scavenging agents for use in polyalkoxy-terminated polysiloxane RTV compositions to obtain improved shelf stability.

It is another object of the present invention to provide a method for producing silicone RTV compositions which include the novel hydroxy scavenging agents of the present invention.

Other objects and advantages of the present invention will be obvious from the following detailed description.

SUMMARY OF THE INVENTION

In accordance with one embodiment of the present invention there is provided a stable, one package, silicone RTV composition convertible to a tack-free elastomer, comprising:

(A) a polydiorganosiloxane base polymer wherein the silicon atom at each chain end is terminated with at least two alkoxy radicals;

(B) an effective amount of condensation catalyst; and (C) a stabilizing amount of scavenger for hydroxy radicals selected from the group consisting of compounds having the general formula:

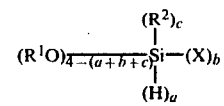

and compounds having the general formula

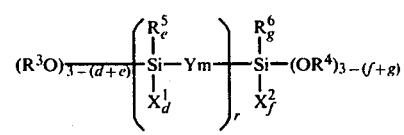

where $R^1$, $R^3$, and $R^4$ are $C_{(1-8)}$ aliphatic organic radicals selected from the group consisting of alkyl, alkylether, alkylester, alkylketone and alkylcyano radicals, or a $C_{(7-13)}$ aralkyl radical; $R^2$ is a $C_{(1-13)}$ monovalent substituted or unsubstituted hydrocarbon radical or a moiety selected from the group consisting of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements, or mixtures thereof; $R^5$ and $R^6$ are independently selected from the group consisting of hydrogen, Y and $C_{(1-13)}$ monovalent substituted or unsubstituted hydrocarbon radicals but wherein at least one $R^5$ or $R^6$ is hydrogen; X, $X^1$ and $X^2$ are hydrolyzable leaving groups selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and z is sufficient to satisfy chemical valence requirements; a is an integer equal to 1 to 4, b is an integer equal to 0 to 3, c is an integer equal to 0 to 3, $4-(a+b+c)$ is an integer equal to 0 to 3, d is an integer equal to 0 to 2, e is an integer equal to 0 to 2, f is an integer equal to 0 to 3, g is an integer equal to 0 to 3, $d+e$ equals 0 to 2, $f+g$ equals 0 to 3, m is equal to 0 or a positive integer and r is equal to at least 1.

DESCRIPTION OF THE INVENTION

In its broadest aspect the present invention provides a stable, one package, substantially anhydrous and substantially acid-free, room temperature vulcanizable organopolysiloxane composition, stable under ambient conditions in the substantial absence of moisture over an extended period of time, and convertible to a tack-free elastomer, comprising:

(A) a polydiorganosiloxane base polymer wherein the silicon atom at each chain end is terminated with at least two alkoxy radicals;

(B) an effective amount of condensation catalyst; and (C) a stabilizing amount of scavenger for hydroxy functional groups wherein said scavenger contains at least one silicon-hydrogen bond.

In another aspect of the present invention, the RTV composition which is convertible to a tack-free elastomer comprises:

(A) a silanol-terminated polydiorganosiloxane base polymer;

(B) an effective amount of condensation catalyst;

(C) a stabilizing amount of scavenger for hydroxy functional groups wherein said scavenger contains at least one silicon-hydrogen bond;

(D) an effective amount of crosslinking silane of the formula

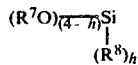

where $R^7$ is a $C_{(1-8)}$ aliphatic organic radical selected from the group consisting of alkyl, alkylether, alkylester, alkylketone and alkylcyano radicals or a $C_{(7-13)}$ aralkyl radical; $R^8$ is a $C_{(7-13)}$ monovalent substituted or unsubstituted hydrocarbon radical; and h equals 0 or 1; and (E) optionally, an effective amount of a co-catalyst or curing accelerator selected from the group consisting of substituted guanidines, amines and mixtures thereof.

The polydiorganosiloxane base polymer, which can be either alkoxy endstopped or silanol endstopped, is well known in the art and can easily be prepared by the skilled artisan. The reader interested in obtaining more detailed information is referred to the patent of White et al., U.S. Pat. No. 4,395,526, issued July 26, 1983, which is incorporated herein by reference. For more general information relating to polydiorganosiloxane polymers useful in formulating silicone RTV compositions, the reader is referred to U.S. Pat. Nos. 3,065,194 and 3,127,363 to Nitzsche et al.; 3,133,891 to Ceyzeriat; 3,161,614 and 3,170,894 to Brown et al.; 3,296,161 to Kulpa and 3,296,195 to Goossens, all of which are incorporated herein by reference.

With respect to the condensation catalyst, such catalysts are also well known in the art and a rather exhaustive listing of suitable condensation catalysts is provided in the specification of White et al. However, it should be noted that tin compounds are the preferred condensation catalyst and that dibutyltindiacetate is the most preferred condensation catalyst.

The present invention is based on the surprising discovery that silicone compounds having at least one silicon-hydrogen bond can be utilized as scavengers for chemically combined hydroxy groups such as methanol and water. This is particularly surprising in view of White et al., U.S. Pat. No. 4,395,526, issued July 26, 1983, which discloses the use of silane derivatives as scavenging agents but which allows only the presence of $C_{(1-13)}$ monovalent substituted or unsubstituted hydrocarbon radicals and not hydrogen. Accordingly, all of the subsequent related patent applications also excluded silicone compounds containing silicon-hydrogen bonds.

The present applicant has found that the scavenging agents may contain only hydrogen, alkyl radicals and/or alkoxy radicals or they may also include previously recognized scavenging agents (i.e. hydrolyzable leaving groups), for example, amido, amino, carbamato, enoxy, imidato, isocyanato, oximato, thioisocyanato and ureido radicals as disclosed by White et al.

While any compound having at least one silicon-hydrogen bond is intended to be within the scope of the present invention, the preferred scavengers for hydroxy radicals are selected from the group consisting of compounds having the general formula

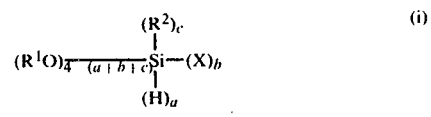

and compounds having the general formula

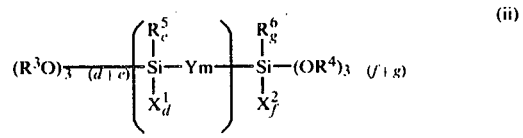

where $R^1$, $R^3$ and $R^4$ are $C_{(1-8)}$ aliphatic organic radicals selected from the group consisting of alkyl, alkylether, alkylester, alkylketone and alkylcyano radicals, or a $C_{(7-13)}$ aralkyl radical; $R^2$ is a $C_{(1-13)}$ monovalent substituted for unsubstituted hydrocarbon radical or a moiety selected from the group consisting of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd, and Fe where z is sufficient to satisy chemical valence requirements, or mixtures thereof; $R^5$ and $R^6$ are independently selected from the group consisting of hydrogen, Y, and $C_{(1-13)}$ monovalent substituted or unsubstituted hydrocarbon radicals but wherein at least one $R^5$ or $R^6$ f is hydrogen; X, $X^1$ and $X^2$ are hydrolyzable leaving groups selected from the group consisting of amido, amino, carbamato, enoxy, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd, and Fe and where z is sufficient to satisfy chemical valence requirements; a is an integer equal to 1 to 4, b is an integer equal to 0 to 3, c is an integer equal to 0 to 3, 4−(a+b+c) is an integer equal to 0 to 3, d is an integer equal to 0 to 2, e is an integer equal to 0 to 2, f is an integer equal to 0 to 3, g is an integer equal to 0 to 3, d+e is an integer equal to 0 to 2, f+g is an integer equal to 0 to 3, m is equal to 0 or a positive integer and r is equal to at least 1.

Some of the scavengers for chemically combined hydroxy radicals included within the scope of formula (i) of the present invention are, for example,
trimethoxysilane
triethoxysilane
methyldimethoxysilane
ethyldiethoxysilane
methyldiethoxysilane
ethyldimethoxysilane
dimethoxy(ethylmethylketoximo)silane
methylmethoxy(ethylmethylketoximo)silane
dimethoxy(N-methylcarbamato)silane
ethylmethoxy(N-methylcarbamato)silane
methylisopropenoxysilane
methylmethoxyisopropenoxysilane
dimethoxyisopropenoxysilane
methyldi-isopropenoxysilane
methyldi-N-methylaminosilane
vinldimethoxyaminosilane
methylethylaminosilane
ethylmethoxy(N-ethylpropionamido)silane
methyldi(N-methylbenzamido)silane
dimethoxy(N-methylacetamido)silane
methyldimethoxyacetimidatosilane
methylmethoxy(N, N$^1$N$^1$-trimethylureido)silane
dimethoxyisocyanatosilane
ethylethoxyisocyanatosilane
methoxydiisocyanatosilane
dimethoxythioisocyanatosilane.

Some of the scavengers for chemically combined hydroxy radicals included within the scope of formula (ii) of the present invention are, for example,
tetramethyldisilane
tetramethyldisiloxane
dimethyldimethoxydisilane
dimethyldimethoxydisiloxane
tetramethyldimethoxytrisiloxane
tetraethyldimethoxytrisiloxane
tetramethyldisilazane
dimethyldimethoxydisilazane
3-siloxytrisilthiane
silylthiodisiloxane
silylthiodimethyldisiloxane.

The foregoing lists are merely a sampling of compounds within the scope of the present invention and are not intended to be limiting in any manner. However, triethoxysilane and tetramethyldisiloxane have been found to be particularly effective scavengers for hydroxy radicals and thus are most preferred.

Because the hydroxy scavenging agents of the present invention may liberate hydrogen gas, the composition may also include an H$_2$ gas scavenger. One suitable group of hydrogen gas scavengers is unsaturated hydrocarbons, either linear or cyclic and having either double or triple bonds. Dicyclopentadiene has been found to be particularly effective as a scavenger for hydrogen gas. Another effective means for scavenging hydrogen gas is the use of molecular sieves. The use of 4 Angstrom molecular sieves has been found to be particularly effective in practicing the present invention.

When the base polymer is silanol terminated it may be necessary or desirable to include an effective amount of curing accelerator so as to endcap such polymer with alkoxy groups. Curing accelerators used in the practice of the present invention are selected from the group consisting of substituted guanidines, amines and mixtures thereof. The reader interested in obtaining additional information relating to such compounds is referred to White et al. and U.S. Pat. Nos. 4,180,642 and 4,248,993 to Takago, both of which are incorporated herein by reference.

It should also be noted that in those instances where the scavenger for hydroxy functional groups does not also function as a crosslinking agent, it is necessary to include an effective amount of a crosslinking silane of the formula

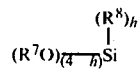

where R$^7$ is a C$_{(1-8)}$ aliphatic organic radical selected from the group consisting of alkyl, alkylether, alkylester, alkylketone and alkylcyano radicals or a C$_{(7-13)}$ aralkyl radical, R$^8$ is a C$_{(1-13)}$ monovalent substituted or unsubstituted hydrocarbon radical and h equals 0 or 1. Further information relating to alkoxy functional crosslinking agents can be found in the disclosure of White et al. and the references cited therein.

Various fillers can also be incorporated into the composition of the present invention, for example, titanium dioxide, zirconium silicate, silica aerogel, iron oxide, diatomaceous earth, fumed silica, carbon black, precipitated silica, glass fibers, polyvinylchoride, ground quartz and calcium carbonate. The amount of filler utilized can be varied over wide limits in accordance with the intended use. For example, in some sealant applications the curable composition can be used free of filler whereas in other applications, such as utilizing the curable composition for making binder material, as much as 700 parts or more of filler per part of organopolysiloxane on a weight basis, can be employed. Preferably the filler is present in an amount ranging from 10 to 300 parts per 100 parts organopolysiloxane.

Of course, adhesion promoters, sag control agents, plasticizers and the like can also be included in the composition of the present invention.

So that those skilled in the art might be better able to practice the present invention, the following examples are given by way of illustration and not by way of limitation.

EXAMPLES

Example 1

A dimethoxy endcapped polydiorganosiloxane base polymer was placed in a Semkit ® mixing tube, the tube was capped, and all air bubbles were expelled. Thereafter, 2.5 grams of tetramethyldisiloxane, 0.3 grams dibutyltindiacetate and 1.3 grams aminoethylaminopropyltrimethoxysilane were added through the dasher rod and the tube contents mixed for 15 minutes. This mixture was transferred to aluminum toothpaste tubes for heat aging. Tack-free times were measured initially, and after 24, 48 and 72 hours at 100° C. In all cases the tack-free times were 40 minutes.

Examples 2 to 4

The compositions of these examples were prepared and tested as in Example 1. However, in Example 2 H Si (OEt)$_3$ was used in place of the (HSiMe$_2$)$_2$O, and in Example 3 not only was HSi(OEt)$_3$ used in place of (HSiMe$_2$)$_2$O, but also 1.5 g. of dicyclopentadiene was added as a scavenger for hydrogen gas which might evolve from the hydroxy scavenging reaction. The results, which were similar to the results of Example 1, are set forth in Table I. Example 4 is a control which uses Si(OEt)$_4$ as a hydroxy scavenging agent.

Examples 5 and 6

The compositions of these examples were prepared and tested as in Example 1. Example 5 further included a 5 Angstrom molecular sieve as an H$_2$ gas scavenger and (Me$_2$N)$_2$—C=N—(CH$_2$)$_3$CH$_3$ as a curing accelerator. The composition cured but the tack-free times were unacceptably long: 180 minutes initially, 5 hours after 48 hours at room temperature, and 7 hours after 48 hours at 100° C. Such very long tack-free times are believed to be caused by the 5 Angstrom molecular sieves. This effect of molecular sieves when used with di-n-hexylamine curing accelerator was known, and the more basic (Me$_2$N)$_2$—C=N—(CH$_2$)$_3$CH$_3$ was used with the hope of overcoming the problem. Of course, if a curing accelerator is not required, the 5 Angstrom molecular sieves may be utilized as an H$_2$ gas scavenger. That Example 5 cures after heat aging indicates that the scavenger is effective in the presence of molecular sieves.

Example 6 uses 4 Angstrom molecular sieves and tetramethyldisiloxane as the hydrogen gas and hydroxy scavengers respectively. The tack-free times immediately after preparation, after 24 hours at 100° C. and after 48 hours at 100° C. are also provided in Table I.

TABLE I

| Example | Scavenger | Other Additives | Tack-Free Time (minutes) | | | |
|---|---|---|---|---|---|---|
| | | | Initial | @ 100° C. | @ 100° C. | @ 100° C. |
| 2 | 1.5 grams H Si(OEt)$_3$ | — | — | 40 | — | — |
| 3 | 3.0 grams H Si(OEt)$_3$ | 1.5 grams dicyclopentadiene | 40 | 30 | 35 | 60 |
| 4 | 4.0 grams Si(OEt)$_4$ | — | 20 | No cure | | |
| 5$^{(1)}$ | 1.0 grams H Si(OEt)$_3$ | 2.0 grams 5A Molecular Sieve | 180 | — | 420 | — |
| 6 | 1.0 grams (HSiMe$_2$)O | 1.5 grams 4A Molecular Sieve | 15 | 20 | 70 | — |

$^{(1)}$After standing at room temperature for 48 hours, the tack-free time was 300 minutes.

The examples given in Table I show that Si—H containing materials are effective scavengers for hydroxy functional groups.

I claim:

1. A stable, one package, substantially anhydrous and substantially acid free, room temperature vulcanizable organopolysiloxane composition stable under ambient conditions in the substantial absence of moisture over an extended period of time and convertible to a tack-free elastomer, comprising:

(A) a polydiorganosiloxane base polymer wherein the silicon atom at each chain end is terminated with at least two alkoxy radicals;

(B) an effective amount of condensation catalyst; and (C) a stabilizing amount of scavenger for hydroxy functional groups selected from the group consisting of trimethoxysilane, triethoxysilane, methyldimethoxysilane, ethyldiethoxysilane, methyldiethoxysilane, ethyldimethoxysilane, dimethoxy(ethylmethylketoximo)silane, methylmethoxy(ethylmethylketoximo)silane, dimethoxy(N-methylcarbamato)silane, ethylmethoxy(N-methylcarbamato)silane, methylisopropenoxysilane, methylmethoxyisopropenoxysilane, dimethoxyisopropenoxysilane, methyldi-isopropenoxysilane, ethylmethoxy(N-ethylpropionamido)silane, methyldi(N-methylbenzamido)silane, dimethoxy(N-methylacetamido)silane, methyldimethoxyacetimidatosilane, methylmethoxy(N,N$^1$,N$^1$-trimethylureido)silane, dimethoxyisocyanatosilane, ethylethoxyisocyanatosilane, methoxydiisocyanatosilane, dimethoxythioisocyanatosilane, tetramethyldisilane, tetramethyldisiloxane, dimethyldimethoxydisilane, dimethyldimethoxydisiloxane, tetramethyldimethoxytrisiloxane, tetraethyldimethoxytrisiloxane, 3-siloxytrisilthiane, silylthiodisiloxane, and silylthiodimethyldisiloxane.

2. A stable, one package, substantially anhydrous and substantially acid-free room temperature vulcanizable organopolysiloxane composition stable under ambient conditions in the substantial absence of moisture over an extended period of time and convertible to a tack-free elastomer, comprising:

(A) a silanol terminated polydiorganosiloxane base polymer;

(B) an effective amount of a crosslinking silane of the formula

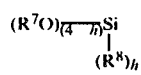

where R$^7$ is a C$_{(1-8)}$ aliphatic organic radical selected from the group consisting of alkyl, alkylether, alkylester, alkylketone and alkylcyano radicals or a C$_{(7-13)}$ aralkyl radical; R$^8$ is a C$_{(1-13)}$ monovalent substituted or unsubstituted hydrocarbon radical, and h equals 0 or 1;

(C) an effective amount of condensation catalyst; and (D) a stabilizing amount of scavenger for hydroxy functional groups selected from the group consisting of trimethoxysilane, triethoxysilane, methyldimethoxysilane, ethyldiethoxysilane, methyldiethoxysilane, ethyldimethoxysilane, dimethoxy(ethylmethylketoximo)silane, methylmethoxy(ethylmethylketoximo)silane, dimethoxy(N-methylcarbamato)silane, ethylmethoxy(N-methylcarbamato)silane, methylisopropenoxysilane, methylmethoxyisopropenoxysilane, dimethoxyisopropenoxysilane, methyldi-isopropenoxysilane, ethylmethoxy(N-ethylpropionamido)silane, methyldi(N-methylbenzamido)silane, dimethoxy(N-methylacetamido)silane, methyldimethoxyacetimidatosilane, methylmethoxy(N-N$^1$,N$^1$-trimethylureido)silane, dimethoxyisocyanatosilane, ethylethoxyisocyanatosilane, methoxydiisocyanatosilane, dimethoxythioisocyanatosilane, tetramethyldisilane, tetramethyldisiloxane, dimethyldimethoxydisilane, dimethyldimethoxydisiloxane, tetramethyldimethoxytrisiloxane, tetraethyldimethoxytrisiloxane, 3-siloxytrisilthiane, silylthiodisiloxane and silylthiodimethyldisiloxane.

3. The composition of claim 1 or 2 further comprising an effective amount of curing accelerator selected from the group consisting of substituted guanidines, amines and mixtures thereof.

4. The composition of claim 1 or 2 wherein the scavenger is selected from the group consisting of trimethoxysilane, triethoxysilane, methyldimethoxysilane, ethyldimethoxysilane, methyldiethoxysilane, ethyldiethoxysilane, tetramethyldisilane, tetramethyldisiloxane, dimethyldimethoxydisilane and dimethyldimethoxydisiloxane.

5. The composition of claim 1 or 2 wherein the scavenger is selected from the group consisting of triethoxysilane and tetramethyldisiloxane.

6. The composition of claim 1 or 2 further comprising a hydrogen gas scavenger.

7. The composition of claim 6 wherein the hydrogen gas scavenger is selected from the group consisting of unsaturated hydrocarbons and molecular sieves.

8. The composition of claim 7 wherein the hydrogen gas scavenger is selected from the group consisting of dicyclopentadiene and molecular sieves of from about 3 to about 5 Angstroms.

9. A method for making a one package, substantially anhydrous and substantially acid-free room temperature vulcanizable composition curable to the solid elastomeric state, which method comprises agitating under substantially anhydrous conditions at a temperature in the range of from 0° C. to 180° C., a room temperature vulcanizable material selected from:
(i) a mixture comprising:
(a) 100 parts of a silanol terminated polydiorganosiloxane consisting essentially of chemically combined units of the formula:

$$-\underset{\underset{R^3}{|}}{\overset{\overset{R^3}{|}}{Si}}O-,$$

(b) an effective amount of a condensation catalyst,
(c) a stabilizing amount of scavenger for hydroxy functional groups selected from the group consisting of trimethoxysilane, triethoxysilane, methyldimethoxysilane, ethyldiethoxysilane, methyldiethoxysilane, ethyldimethoxysilane, dimethoxy(ethylmethylketoximo)silane, methylmethoxy(ethylmethylketoximo)silane, dimethoxy(N-methylcarbamato)silane, ethylmethoxy(N-methylcarbamato)silane, methylisopropenoxysilane, methylmethoxyisopropenoxysilane, dimethoxyisopropenoxysilane, methyldiisopropenoxysilane, ethylmethoxy(N-ethylpropionamido)silane, methyldi(N-methylbenzamido)silane, dimethoxy(N-methylacetamido)silane, methyldimethoxyacetimidatosilane, methylmethoxy(N,N¹,N¹-trimethylureido)silane, dimethoxyisocyanatosilane, ethylethoxyisocyanatosilane, methoxydiisocyanatosilane, dimethoxythioisocyanatosilane, tetramethyldisilane, tetramethyldisiloxane, dimethyldimethoxydisilane, dimethyldimethoxydisiloxane, tetramethyldimethoxytrisiloxane, tetraethyldimethoxytrisiloxane, 3-siloxytrisilthiane, silylthiodisiloxane, and silylthiodimethyldisiloxane,
(d) an effective amount of a crosslinking silane of the formula:

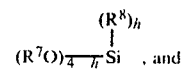

(e) 0–5 parts of a curing accelerator selected from the group consisting of substituted guanidines, amines and mixtures thereof; and
(ii) a mixture comprising:
(a) 100 parts of a polydiorganosiloxane base polymer wherein the silicon atom at each chain end is terminated with at least two alkoxy groups,
(b) an effective amount of a condensation catalyst,
(c) a stabilizing amount of scavenger for hydroxy functional groups selected from the group consisting of trimethoxysilane, triethoxysilane, methyldimethoxysilane, ethyldiethoxysilane, methyldiethoxysilane, ethyldimethoxysilane, dimethoxy(ethylmethylketoximo)silane, methylmethoxy(ethylmethylketoximo)silane, dimethoxy(N-methylcarbamato)silane, ethylmethoxy(N-methylcarbamato)silane, methylisopropenoxysilane, methylmethoxyisopropenoxysilane, dimethoxyisopropenoxysilane, methyldiisopropenoxysilane, ethylmethoxy(N-ethylpropionamido)silane, methyldi(N-methylbenzamido)silane, dimethoxy(N-methylacetamido)silane, methyldimethoxyacetimidatosilane, methylmethoxy(N,N¹,N¹-trimethylureido)silane, dimethoxyisocyanatosilane, ethylethoxyisocyanatosilane, methoxydiisocyanatosilane, dimethoxythioisocyanatosilane, tetramethyldisilane, tetramethyldisiloxane, dimethyldimethoxydisilane, dimethyldimethoxydisiloxane, tetramethyldimethoxytrisiloxane, tetraethyldimethoxytrisiloxane, 3-siloxytrisilthiane, silylthiodisiloxane, and silylthiodimethyldisiloxane,
(d) 0–10 parts of a crosslinking silane of the formula:

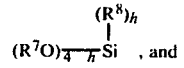

(e) 0–5 parts of a curing accelerator selected from the group consisting of substituted guanidines, amines and mixtures thereof;

where $R^3$ and $R^8$ are independently selected monovalent substituted or unsubstituted hydrocarbon radicals having 1 to 13 carbon atoms, $R^7$ is a $C_{(1-8)}$ aliphatic organic radical selected from the group consisting of alkyl, alkylether, alkylester, alkylketone and alkylcyano radicals or a $C_{(7-13)}$ aralkyl radical and h equals 0 or 1.

10. The method of claim 9 wherein the scavenger is selected from the group consisting of trimethoxysilane, triethoxysilane, methyldimethoxysilane, ethyldimethoxysilane, methyldiethoxysilane, ethyldiethoxysilane, tetramethyldisilane, tetramethyldisiloxane, dimethyldimethoxydisilane and dimethyldimethoxydisiloxane.

11. The method of claim 9 wherein the scavenger is selected from the group consisting of triethoxysilane and tetramethyldisiloxane.

12. The method of claim 9 wherein mixture (i) and mixture (ii) further comprise an effective amount of a hydrogen gas scavenger.

13. The method of claim 12 wherein the hydrogen gas scavenger is selected from the group consisting of unsaturated hydrocarbons and molecular sieves.

14. The method of claim 13 wherein the hydrogen gas scavenger is selected from the group consisting of dicyclopentadiene and molecular sieves of from about 3 to about 5 Angstroms.

* * * * *